(12) United States Patent
Agrawal et al.

(10) Patent No.: US 7,519,064 B1
(45) Date of Patent: Apr. 14, 2009

(54) VIRTUAL TRIBUTARY PROCESSING USING SHARED RESOURCES

(75) Inventors: Ashutosh Agrawal, Rohnert Park, CA (US); Arthur G. Enyedy, Petaluma, CA (US); Eric Arthur Holmberg, Sausalito, CA (US); Prashant Jain, Rohnert Park, CA (US)

(73) Assignee: Mahi Networks, Inc., Petaluma, CA (US)

( * ) Notice: Subject to any disclaimer, the term of this patent is extended or adjusted under 35 U.S.C. 154(b) by 1059 days.

(21) Appl. No.: 10/728,656

(22) Filed: Dec. 5, 2003

(51) Int. Cl.
*H04L 12/28* (2006.01)
*H04J 3/16* (2006.01)

(52) U.S. Cl. .................... 370/395.1; 370/466; 370/469; 370/907

(58) Field of Classification Search ........................ None
See application file for complete search history.

(56) References Cited

U.S. PATENT DOCUMENTS

| | | | |
|---|---|---|---|
| 5,131,013 A | 7/1992 | Choi | |
| 5,337,334 A | 8/1994 | Molloy | |
| 5,959,996 A | 9/1999 | Byers | |
| 6,751,239 B2 | 6/2004 | Raman et al. | |
| 6,754,174 B1 | 6/2004 | Ben-Zur et al. | |
| 6,798,779 B1* | 9/2004 | Shimbashi et al. | 370/395.1 |
| 6,868,066 B1* | 3/2005 | Fujita | 370/236.2 |
| 7,227,876 B1 | 6/2007 | Cochran et al. | |
| 2001/0012288 A1 | 8/2001 | Yu | |
| 2002/0090006 A1 | 7/2002 | Chang et al. | |
| 2002/0191724 A1 | 12/2002 | Bleisteiner et al. | |
| 2003/0043810 A1* | 3/2003 | Boduch et al. | 370/395.1 |
| 2004/0120360 A1 | 6/2004 | Tanis et al. | |

* cited by examiner

*Primary Examiner*—Firmin Backer
*Assistant Examiner*—Nittaya Juntima

(57) ABSTRACT

A non-blocking switching architecture having a fabric that is capable of switching on two levels by formatting signals crossing the switching fabric as "microcells" having a predetermined format. The microcells are routed by the switching fabric from an ingress line card to destination devices that can include egress line cards and/or processing resources. The processing resources can reformat the signals carried by the microcells to a second format. The reformatted signals can then be packaged as microcells and routed to a selected processing resource to provide switching in the second format. The processing resources transform the switched signals in the second format to a signal in the original format, which is carried by the switching fabric as microcells to an egress line card.

51 Claims, 6 Drawing Sheets

VIRTUAL TRIBUTARY PROCESSING USING SHARED RESOURCES

RELATED APPLICATIONS

The present U.S. Patent application is related to the following U.S. Patent applications:

1) "PACKET PROCESSING USING SHARED RESOURCES," having an application Ser. No. 10/728,646, filed Dec. 5, 2003; and 2) "BOUNDARY PROCESSING BETWEEN A SYNCHRONOUS NETWORK AND A PLESIOCHRONOUS NETWORK," having an application Ser. No. 10/728,657, filed Dec. 5, 2003.

TECHNICAL FIELD

The invention relates to signal switching. More particularly, the invention relates to an architecture that provides scalable switching functionality in a network switch.

BACKGROUND

Telecommunication networks transport and switch traffic according to time division multiplexed (TDM) protocols and synchronous optical network (SONET) protocols. It is common for traffic processed by a network switch to be a combination of TDM traffic (e.g., SONET, SDH), which use different formats and timing. SONET traffic can be switched at various levels based on the granularity required by the traffic. The lower levels of granularity include the virtual tributary (VT) level (e.g., VT1.5, VT2, VT3, VT6) and the STS-1 level. One STS-1 carries multiple VT traffic streams. Timing requirements for VT level traffic and STS level traffic are well known in the art.

There are two traditional approaches to designing a VT-level switch. The first approach is to design each line card with full VT processing functionality, which is conceptually illustrated in FIG. 1. Line cards 100 and 150 send and receive SONET signals, for example, OC-1 formatted signals. Optical signals (e.g., OC-1) are converted to corresponding electrical signals (e.g., STS-1). Line cards 100 and 150 demap the VT1.5 signals from the incoming STS-1 signal and transmit the VT1.5 signals to VT switch fabric 190 for switching. Line cards 100 and 150 receive VT1.5 signals from VT switch fabric 190 and map multiple VT1.5 signals to outgoing STS-1 signals. The STS-1 signals are converted to OC-1 signals for transmission over a SONET network.

The architecture of FIG. 1 provides 100% VT1.5 grooming. However, few networks require 100% VT1.5 grooming. Service providers rarely require more than 40% VT1.5 grooming and often require less than 25% VT1.5 grooming. Therefore, the architecture of FIG. 1 is inefficient.

A second approach to providing VT-level switching is to provide a central VT switching resource, which is conceptually illustrated in FIG. 2. Line cards 200 and 250 send and receive data according to SONET protocols. Line cards 200 and 250 provide signals to STS-1 switch fabric 275 at the STS-1 level. If VT-level switching is required, the STS-1 level signals to be switched are sent to VT switch 290, where VT level demapping and switching are performed. After the VT-level switching is performed, the VT signals are mapped to STS-1 signals that are sent to STS-1 switch fabric 275 to be sent to a destination line card.

The architecture of FIG. 2 is a blocking architecture unless VT switch 290 provides 100% VT switching. Blocking architectures may not provide the desired level of switching performance. For example, if VT switch 290 is capable of switching 100 VT signals and more than 100 VT signals are to be switched, the signals in excess of 100 are blocked. If a second VT switch is coupled with STS-1 switch fabric 275, the second VT switch will switch a second group of VT signals. That is, multiple VT switches are mutually exclusive so, while the overall bandwidth to switch all VT signals may be provided, the architecture may be a blocking architecture and not provide the desired functionality.

If VT switch 290 provides 100% VT switching, the cost of a switch according to the architecture of FIG. 2 is comparable to the cost of a switch according to the architecture of FIG. 1. Also, the capacity of (a 100% VT switching) VT switch 290 may not be used efficiently. Thus, neither the architecture of FIG. 1 nor the architecture of FIG. 2 provide efficient VT-level switching.

SUMMARY

In one embodiment, a first group of data blocks carrying data according to a first protocol and having a predetermined format is received from a switching fabric. The first group of data blocks are converted to a first set of two or more groups of data blocks carrying data according to a second protocol and having the predetermined format. The first set of two or more groups of data blocks are transmitted over the switching fabric.

In another embodiment, a second set of two or more groups of data blocks are received from the switching fabric. The second set of two or more groups of data blocks are converted to multiple data streams according to the second protocol. The multiple data streams according to a second signal protocol are converted to a single output data stream according to the first signal protocol.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

The techniques and devices described herein provide a scalable, non-blocking switching architecture having a fabric that is capable of switching on two levels (e.g., STS-1 and VT1.5) by formatting signals crossing the switching fabric as "microcells" having a predetermined format. The microcells are routed by the switching fabric from an ingress line card to destination devices that can include egress line cards and/or processing resources. The processing resources can reformat the signals carried by the microcells (e.g., from one STS-1 stream to multiple VT1.5 channels) to a second format. The reformatted signals can then be packaged as microcells and routed to a selected processing resource to provide switching in the second format. The processing resources transform the switched signals in the second format to a signal in the original format, which is carried by the switching fabric as microcells to an egress line card.

Figure 1:
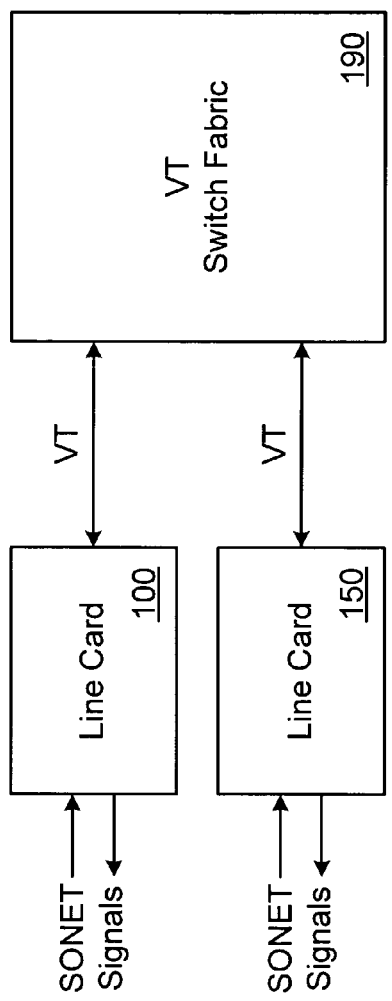
FIG. 1 is a block diagram of a prior art switching architecture with line cards providing 100% VT switching functionality.
Figure 2:
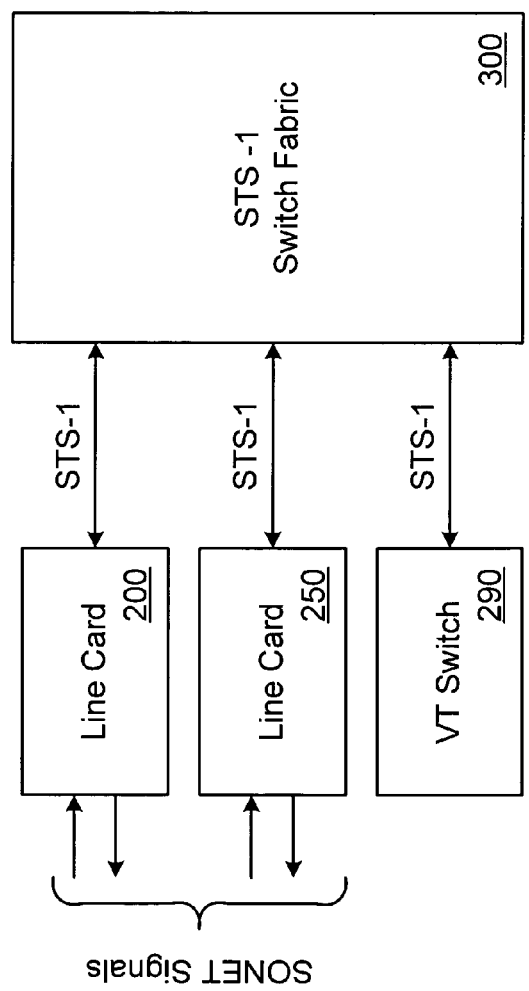
FIG. 2 is a block diagram of a prior art switching architecture with line cards providing less than 100% VT switching functionality.
Figure 3:
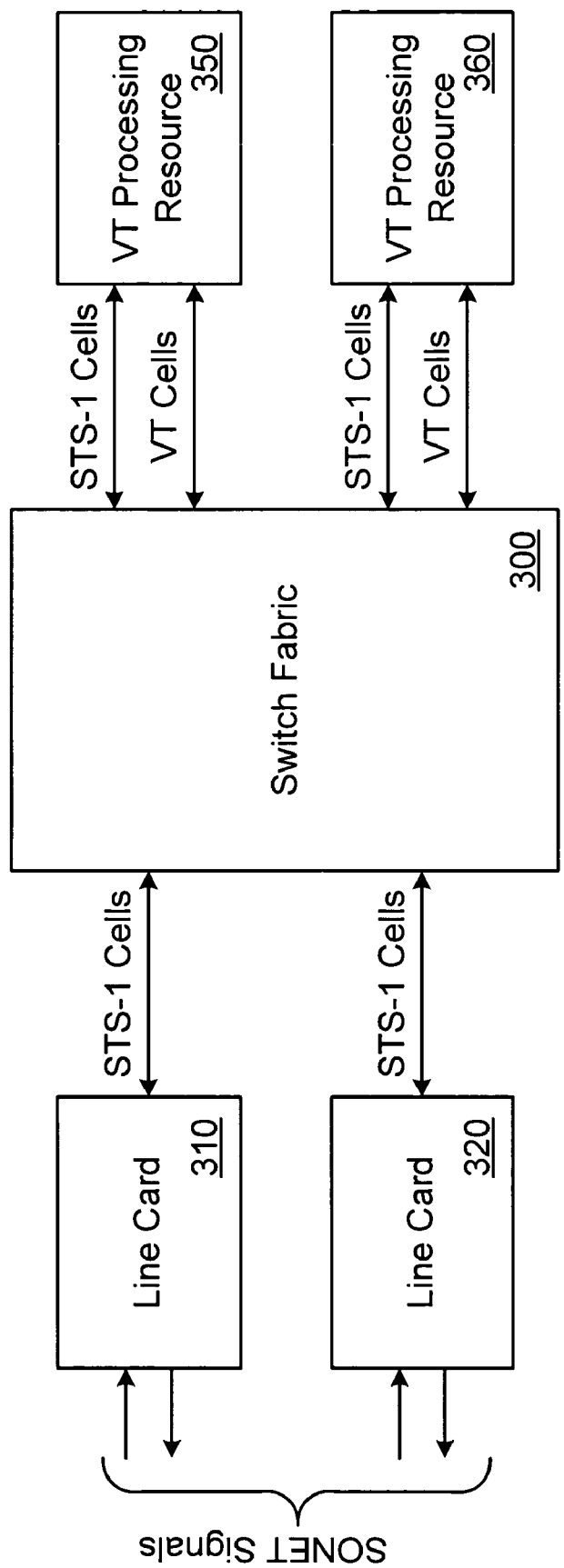
FIG. 3 is a block diagram of one embodiment of a switching architecture having a protocol-independent switch fabric.

FIG. 3 is a block diagram of one embodiment of a switching architecture having a protocol-independent switch fabric. The example of FIG. 3 illustrates two processing resources; however, any number of processing resources can be supported. Further, the architecture of FIG. 3 is illustrated with VT processing resources only. The processing resources can switch at levels other than the VT level and/or packet processing resources can also be coupled with the switch fabric. Various embodiments of packet processing are disclosed in "PACKET PROCESSING USING SHARED RESOURCES," having an application Ser. No. 10/728,646, filed Dec. 5, 2003, which is incorporated by reference herein.

Line cards 310 and 320 include an optical/electrical interface through which optical signals are transmitted and received. One embodiment of line cards 310 and 320 is described in greater detail below. In one embodiment, the optical signals are transmitted according to synchronous optical network (SONET) protocols; however, other protocols could also be used including, for example, Synchronous Digital Hierarchy (SDH) protocols.

Various components of the SONET standards are described in Telcordia Technologies, "Synchronous Optical Network (SONET) Transport System: Common Generic Requirements, GR-253-core," Issue 3, September 2000, Telcordia Technologies, "Transport System Generic Requirements (TSGR): Common Requirements GR-499-core," Issue 2, December 1998, and American National Standards Institute (ANSI) T1.105.03, "Synchronous Optical Network (SONET): Jitter at Network Interfaces," 1994.

Line cards 310 and 320 receive optical signals that are transformed to corresponding electrical signals in any manner known in the art. In one embodiment, the electrical signals are STS-level signals, for example, STS-1, STS-3, STS-12, STS-48 or STS-192. In the example of FIG. 3, the signals are STS-1 signals; however, other signals can also be used.

In one embodiment, line cards 310 and 320 convert the optical signals to STS-1 formatted signals to a predetermined microcell format before transmitting the signals over switch fabric 300. In one embodiment, the predetermined format is a fixed-length cell having a predetermined number of bytes (e.g., 64, 80, 128 bytes) and a header. The header can include information such as, for example, source line card, destination line card and/or destination processing device, etc. Thus, line cards 310 and 320 create deterministic streams of microcells (labeled "STS-1 cells" in FIG. 3) that can be switched by switch fabric 300.

The microcells are routed through switch fabric 300 to a destination device identified in the header of the respective microcells. Any switch fabric that can be configured to route the microcells to the desired destination devices can be used. In one embodiment, switch fabric 300 is the "Protocol-Independent Switch Fabric (PI40)" available from Agere Systems of Allentown, Pa.; however, other switch fabrics can also be used. The destination devices identified in a header of a microcell can be a line card or a processing resource (e.g., VT processing resources 350 and 360).

If STS-1 level switching is required, switch fabric 300 can perform the required switching by routing the microcells containing STS-1 level traffic to the desired destination line cards. The destination line card then assembles the STS-1 data stream from the incoming microcells. When VT level or DS-1 level switching is required, microcells are transmitted to processing resources coupled with switching fabric 300. The architecture described herein supports 3/1 digital cross-connects, which allows switching of DS-1 signals extracted from DS-3 signals that have been extracted from STS-1 signals. In one embodiment, the DS-1 signals are mapped to VT signals, which function as temporary containers. This allows input and output signals to be any combination of STS-1, DS-3 and DS-1 traffic. That is, no VT signals are required in the input or output traffic.

In the example of FIG. 3, microcells carrying STS-1 traffic to be groomed at the VT level are transmitted to VT processing resource 350 or VT processing resource 360. In one embodiment, the VT processing resources perform VT1.5 grooming; however, other levels of VT grooming (e.g., VT2, VT3, VT6) can also be supported.

The VT processing resources receive microcells carrying STS-1 traffic and extract one or more VT1.5 channels from the STS-1 traffic. The VT processing resources transform the VT level traffic to microcells having the predetermined format described above. The microcells carrying VT level traffic (labeled "VT cells" in FIG. 3) are transmitted by the VT processing resource to a destination VT processing resource. The destination VT processing resource can be the same as the source VT processing resource, or the destination VT processing resource can be a different VT processing resource.

The destination VT processing resource converts data from microcells to VT formatted signals. One or more VT signals are combined to generate STS-1 signals to be transmitted to a destination line card. By switching microcells carrying VT level traffic streams, VT level switching can be accomplished with switch fabric 300. Because only microcells carrying STS-1 traffic streams to be switched as the VT level are transmitted to the VT processing resources, the VT processing resources can be efficiently utilized.

Further, because VT microcells are transmitted over switch fabric 300, multiple VT processing resources can interact to provide VT level switching, which allows VT processing resources to be added as necessary to provide an efficient, non-blocking switch architecture. The STS-1 signals from the VT processing resources are converted to microcells and transmitted across switch fabric 300 to the appropriate destination line card.

Figure 4:
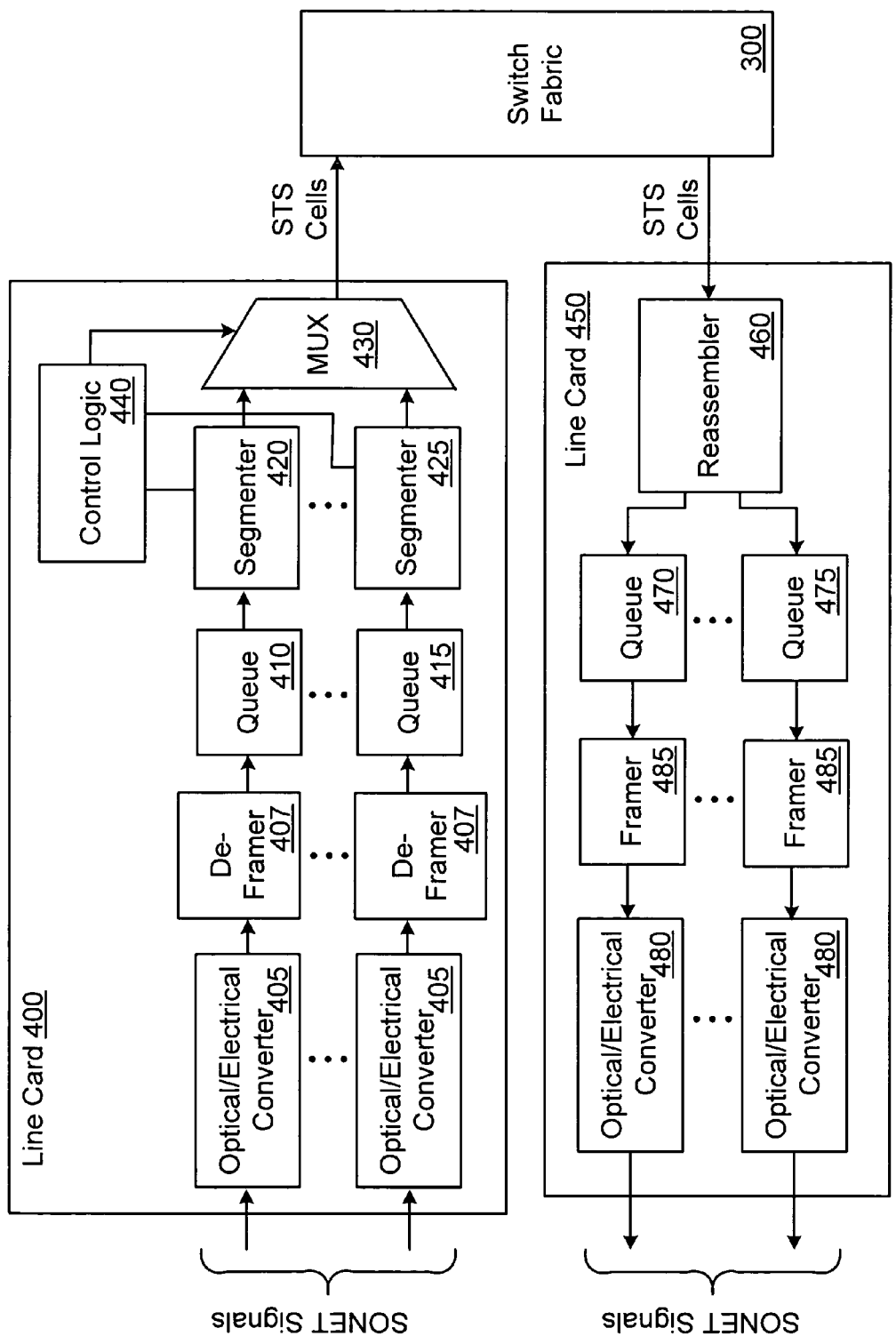
FIG. 4 is a block diagram of one embodiment of an ingress line card and one embodiment of an egress line card coupled with a switch fabric.

FIG. 4 is a block diagram of one embodiment of an ingress line card and one embodiment of an egress line card coupled with a switch fabric. In the example of FIG. 4, the ingress line card and egress line card are illustrated as separate and distinct line cards; however, a single line card can include both ingress and egress functionality.

SONET (or other optical signals) are received by line card 400 from an external source (not illustrated in FIG. 4). In one embodiment, each incoming SONET signal is formatted as an OC-1 signal; however, other signals can also be supported. The optical signals are converted to electrical signals (e.g., OC-1 to STS-1) by optical-to-electrical converters 405. Any technique or device for conversion from optical to electrical signals known in the art can be used. The bit streams carried by the electrical signals output by converters 405 are de-framed by de-framers 407 and stored in queues 410 and 415.

In one embodiment, each STS-1 stream has a corresponding queue (e.g., 410 and 415) on line card 400. The STS-1 streams are stored in the queues until read from the queues to be converted to microcells. Segmenters 420 and 425 read data from queues 410 and 415, respectively, and convert the STS-1 formatted data to microcell formatted data. In one embodiment, the segmenters read fixed-size (e.g., 80 byte) blocks of data from the queues and add header information as determined by control logic 440 to generate microcells that include destination information.

The microcells from segmenters 420 and 425 are selectively passed by multiplexor 430 to switch fabric 300 as STS cells. In one embodiment, control logic 440 provides a set of one or more signals to multiplexor 430 to select the microcells to be transmitted. The microcells are routed by switch fabric 300 as described above to a destination line card to provide STS-1 or to a VT processing resource to provide VT switching.

Line card 450 is an egress line card for the network switch. Line card 450 receives STS cells from switch fabric 300. The STS cells are received by reassembler 460, which assembles the data from multiple microcells into STS-1 formatted signals. Reassembler 460 interprets the microcell header and writes the data payload from the microcell to the correct queue. In one embodiment, reassembler 460 can support multiple STS-1 signals. In one embodiment, each STS-1 signal has a queue (470, 475). The queues store bits in STS-1 format until the bits are converted to SONET frames by a framers 485 and then to optical format (e.g., STS-1 to OC-1), by electrical to optical converters 480. The optical signals are then transmitted to a remote device.

Figure 5:
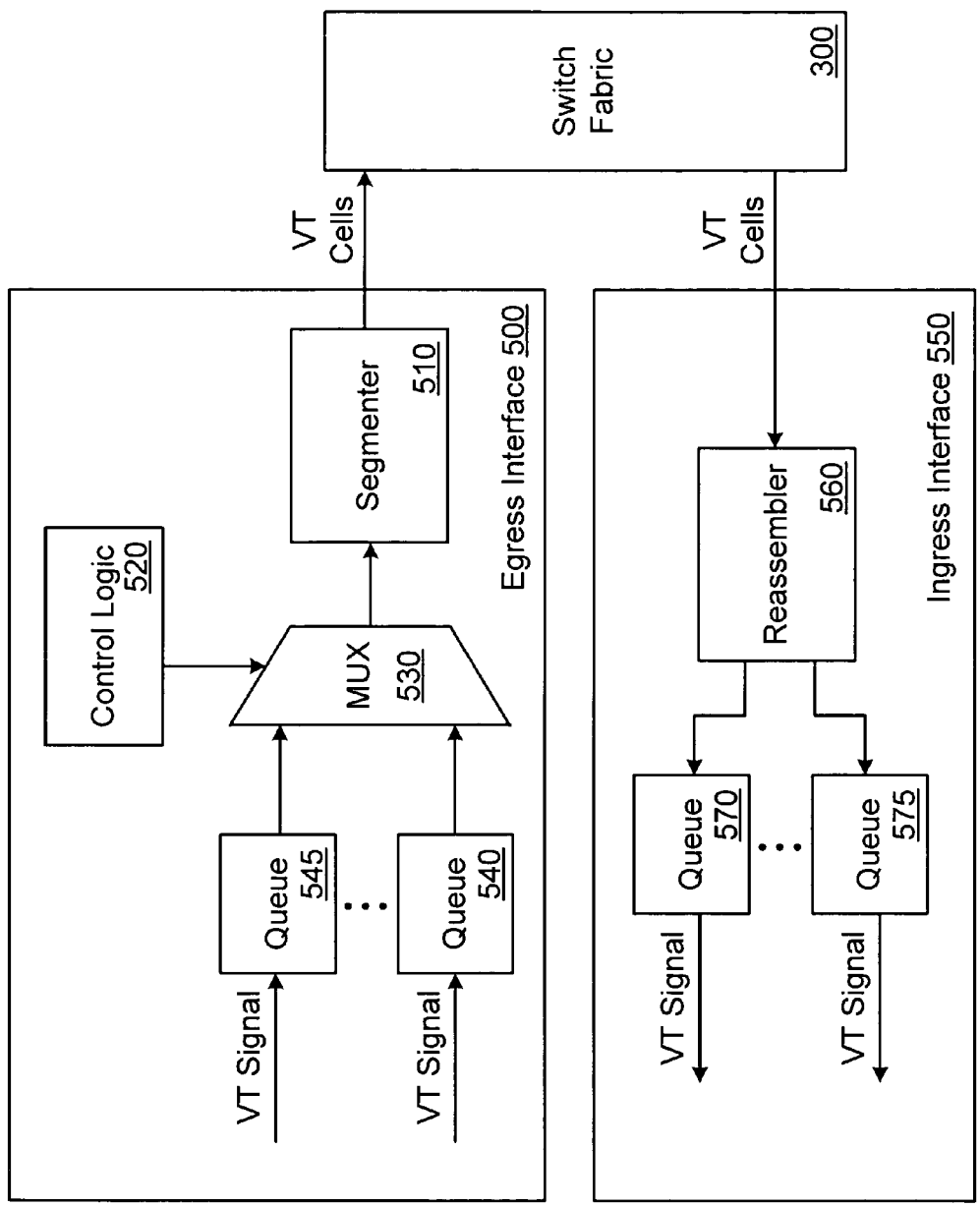
FIG. 5 is a high-level block diagram of one embodiment of VT processing resource ingress interface circuitry and egress interface circuitry.

FIG. 5 is a high-level block diagram of one embodiment of VT processing resource ingress interface circuitry and egress interface circuitry. The block diagram of FIG. 5 is limited to processing of VT cells only for reasons of simplicity of description. Other processing functionality described herein is also included in the VT processing resources.

Multiple VT signals are received by egress interface 500. Each VT signal is stored in a corresponding queue (540, 545). In one embodiment, queues 540 and 545 are first-in/first-out (FIFO) queues. Data from queues 540 and 545 are selected by multiplexor 530 as controlled by control logic 520. The signals output from multiplexor 530 are input to segmenter 510, which converts data from the VT signals into microcells having the format described above.

VT microcells are more complex to assemble than STS microcells because of the timing considerations involved. For example, a VT1.5 data stream is approximately 28 times slower than the corresponding STS-1 data stream to which the VT1.5 data stream belongs because a single STS-1 data stream can carry up to 28 VT1.5 data streams. If segmenter 510 collects the predetermined number of bytes from a single VT1.5 data stream to build a VT microcell, an unacceptable delay would be introduced. In one embodiment "d" bytes from "e" VT data streams, where d*e=c where "c" is the predetermined number of bytes in a microcell are collected to form a VT microcell.

Only the VT data streams that share a common VT processing resource can be combined into a common egress VT microcell. Because the number of VT data streams that are transmitted to a particular VT processing resource is variable, a microcell my not be completely filled with the predetermined number of payload bytes, in which case padding is inserted in the microcell. The VT cells are routed by switch fabric 300 to a destination VT processing resource.

When VT cells are received by ingress interface 550, reassembler 560 assembles the payloads of the VT streams by directing payload data to the queue (570, 575) corresponding to the appropriate VT signal. In one embodiment, egress interface 500 and ingress interface 550 are included in a single VT processing resource that is coupled with switch fabric 300. In one embodiment, a VT processing resource is implemented as a card that can be inserted into a network switch chassis.

Because the VT processing resources can interact with other components of the network switch (e.g., line card, other VT processing resources, packet processing resources), VT processing resources implemented as cards can be added to a switch as needed. This allows the VT-level grooming capacity to be tailored to the unique conditions under which a network switch operates. This scalability and flexibility results in a more cost-effective and resource-efficient network switch as compared to prior art architectures.

The architecture described herein allows one VT processing resource card to protect many VT processing cards. One VT processing resource card can be maintained as a backup in a network switch. If a fault is detected on one of the working VT processing resource cards, traffic for the card having the fault can be routed to the backup card instead. This is referred to as 1:N protection because one card can protect N cards.

Figure 6:
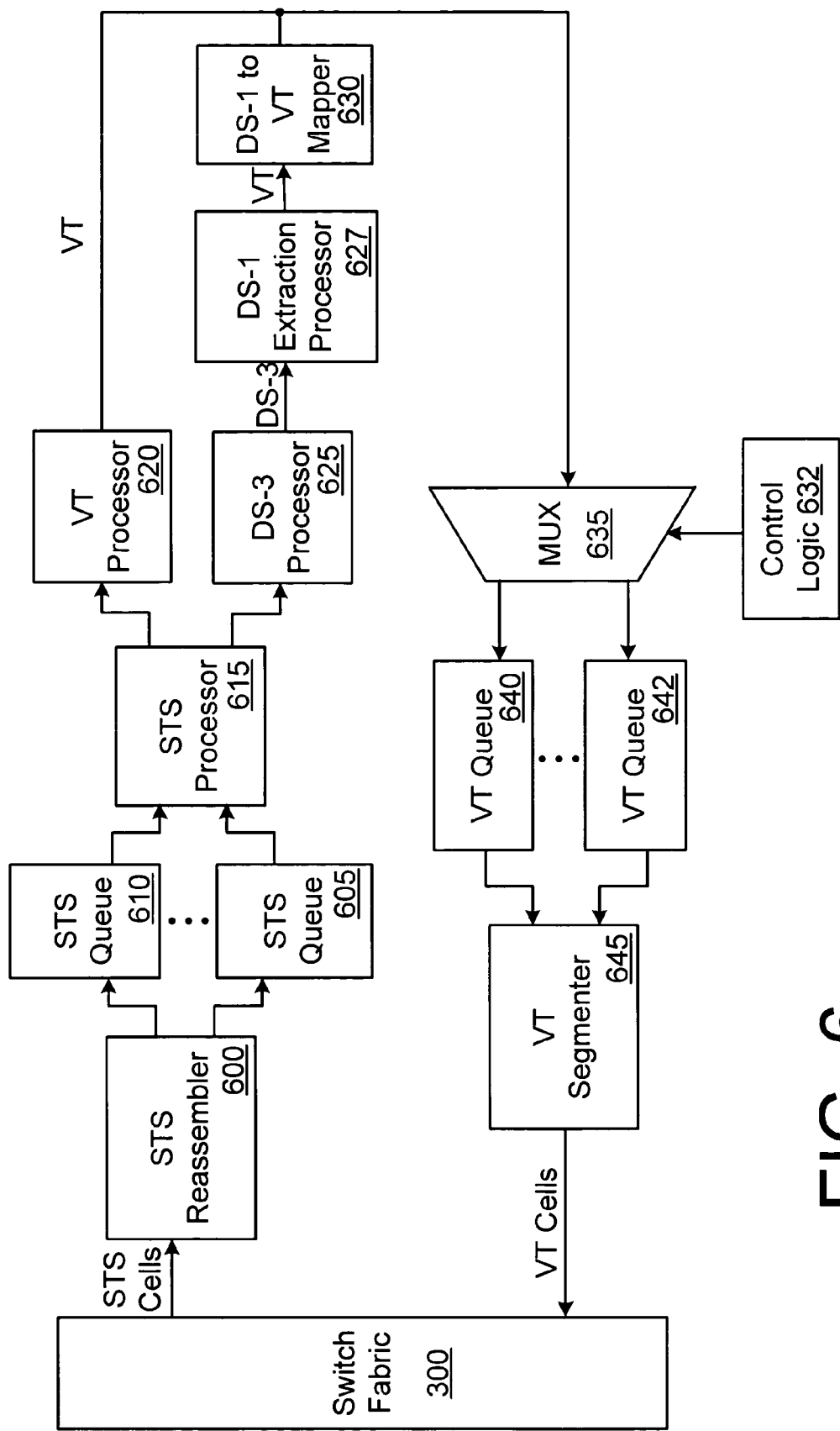
FIG. 6 is a block diagram of one embodiment of a STS-to-VT path of a VT processing resource coupled with a switch fabric.

FIG. 6 is a block diagram of one embodiment of a STS-to-VT path of a VT processing resource coupled with a switch fabric. The VT processing resource of FIG. 6 is a two-pass architecture. The first pass converts STS microcells to VT microcells and the second pass maps VT microcells to STS microcells. The VT microcells are switched by the switch fabric to provide VT level grooming. In one embodiment, the architecture can process STS-1 traffic carrying DS-3/DS-1 traffic, VT1.5/DS-1 traffic, VT1.5 traffic, or any combination of DS-3, DS-1 and VT1.5 traffic.

STS cells are received from switch fabric 300 by STS reassembler 600, which reassembles STS-1 traffic to be buffered in STS queues 605 and 610. Any number of STS traffic streams can be supported, each of which has a corresponding STS queue coupled with reassembler 600. The STS queues provide STS traffic to STS processor 615, which demaps VT (along with VT processor 620) and DS-3 (along with DS-3 processor 625) traffic from STS-1 traffic.

Output traffic from DS-3 processor 625 is transmitted to DS-1 extraction processor 627, which extracts DS-1 traffic (up to 28 per DS-3 stream) from the DS-3 traffic. The DS-1 signals extracted by DS-1 extraction processor 627 are transmitted to multiplexor 635. Any technique known in the art for converting from STS traffic to VT traffic can be used.

Multiplexor 635 selects between VT traffic from either VT processor 620 or mapper 630. In one embodiment, multiplexor 635 is implemented as multiple multiplexors and/or switches controlled by control logic 632 that route signals VT signals to selected destination queues. The output signals from multiplexor 635 are stored in VT queues 640 and 642. In one embodiment, each output VT stream has a corresponding VT queue. VT segmenter 645 operates as described above to generate VT cells to be switched by switch fabric 300.

The architecture of FIG. 6 can support multicast of any of the VT signals. In unicast conditions, at the end of the first pass, each VT is read from a queue and mapped to a VT microcell. For multicast conditions, VT data from a queue is mapped to multiple VT microcells that can be routed to multiple destinations. The only restriction on multicast functionality is the bandwidth of the components used for switching. The multicast functionality can be used, for example, for performance monitoring or testing.

Figure 7:
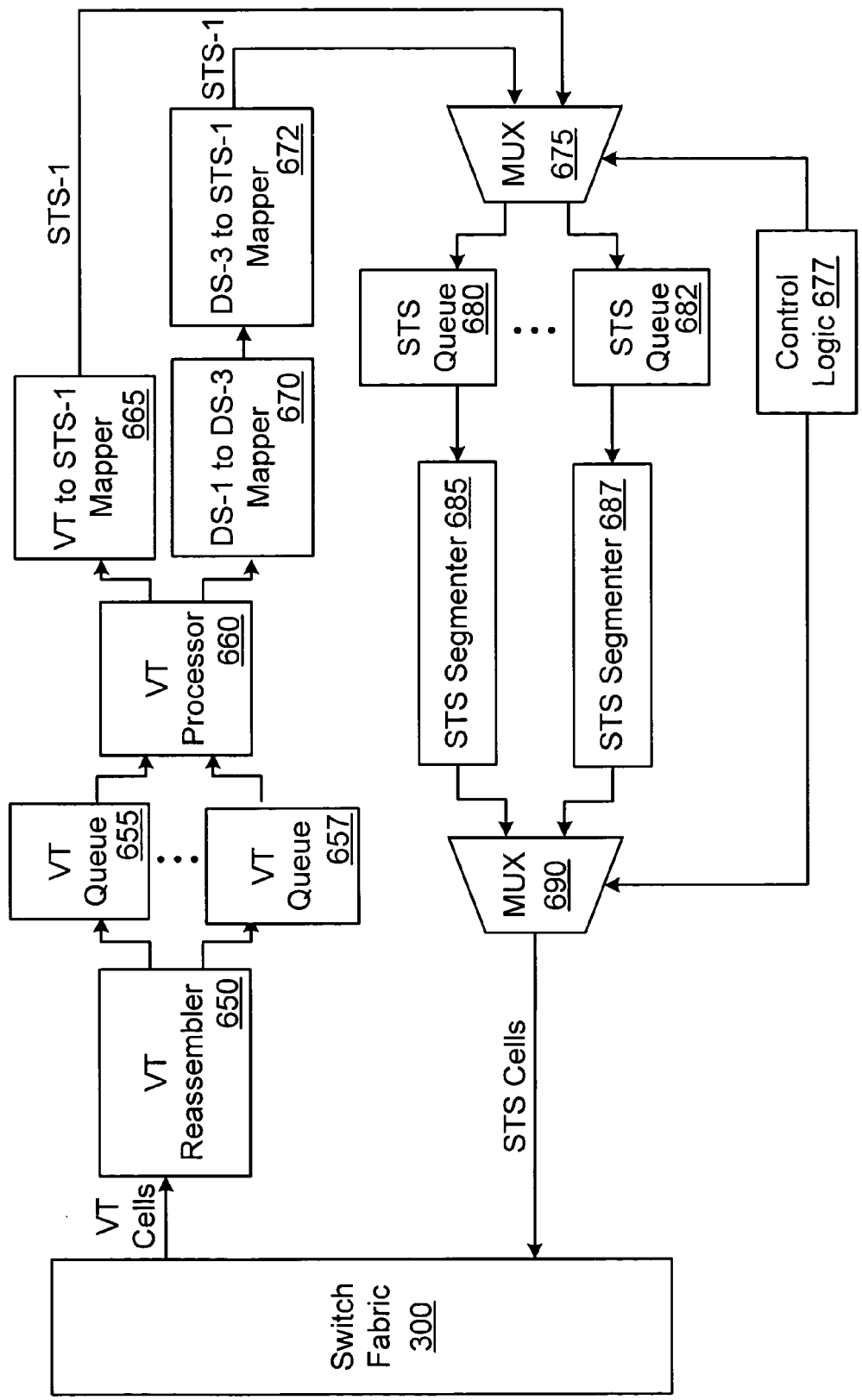
FIG. 7 is a block diagram of one embodiment of a VT-to-STS path of a VT processing resource coupled with a switch fabric.

FIG. 7 is a block diagram of one embodiment of a VT-to-STS path of a VT processing resource coupled with a switch fabric. VT cells that are received from switch fabric 300 are converted to VT traffic by VT reassembler 650 and stored in VT queues 655 and 657. Any number of VT traffic streams can be supported. In one embodiment, each VT traffic stream has a corresponding VT queue to buffer incoming data. Data from the VT queues are read by VT processor 660 to selectively generate VT formatted traffic or DS-1 formatted traffic.

VT traffic from VT processor 660 is mapped to STS-1 formatted traffic by VT to STS-1 mapper 665. DS-1 traffic from VT processor 660 is mapped to DS-3 traffic by DS-1 to DS-3 mapper 670. The DS-3 traffic is then mapped to STS-1 traffic by DS-3 to STS-1 mapper 672. One embodiment for converting signals from VT data streams to DS1 and to STS data streams is disclosed in the above-mentioned U.S. Patent application entitled "BOUNDARY PROCESSING BETWEEN A SYNCHRONOUS NETWORK AND A PLESIOCHRONOUS NETWORK." Other conversion techniques can also be used.

Multiplexor 675 selects between STS-1 traffic from mappers 665 and 672. In one embodiment, multiplexor 675 is implemented as multiple multiplexors and/or switches controlled by control logic 677 that route signals STS-1 signals to selected destination queues. The output signals from multiplexor 675 are stored in STS queues 682 and 682. In one embodiment, each output STS-1 stream has a corresponding STS-1 queue. Any number of STS-1 streams can be supported.

Data from the STS queues are converted to the microcell format by STS segmenters (e.g., 685, 687). Multiplexor 690 selects outputs from the multiple STS segmenters to provide STS cells to switch fabric 300.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   receiving a first group of data blocks carrying data according to a first signal protocol and having a predetermined format from a switching fabric;
   converting the first group of data blocks to a first set of two or more groups of data blocks carrying data according to a second signal protocol and having the predetermined format;
   transmitting the first set of two or more groups of data blocks over the switching fabric;
   receiving a second set of two or more groups of data blocks from the switching fabric;
   converting the second set of two or more groups of data blocks to multiple data streams according to the second signal protocol; and
   converting the multiple data streams according to the second signal protocol to a single output data stream according to the first signal protocol.

2. The method of claim 1 further comprising converting a data stream according to a first signal protocol to a first group of data blocks having the predetermined format by:
   segmenting payload data from the data stream into blocks of data having a predetermined size; and
   appending a header and/or tail indicating a destination for the group of data blocks.

3. The method of claim 1 wherein transmitting the first group of data blocks over the switching fabric to a processing resource comprises routing the first group of data blocks from an ingress line card to the processing resource over the switching fabric.

4. The method of claim 1 wherein transmitting the two or more groups of data blocks over the switching fabric comprises routing the two or more groups of data blocks from a source processing resource to a destination processing resource over the switching fabric.

5. The method of claim 4 wherein the source processing resource and the destination processing resource for a selected group of data blocks comprises a single processing resource.

6. The method of claim 1 further comprising converting the output data stream according to the first signal protocol to a third group of data blocks having the predetermined format.

7. The method of claim 6 further comprising transmitting the third group of data blocks to an egress line card.

8. The method of claim 7 further comprising converting the third group of data blocks to a data stream according to the first signal protocol on the egress line card.

9. The method of claim 8 further comprising:
   converting the data stream according to the first signal protocol on the egress line card to an optical signal; and
   transmitting the optical signal to a remote device.

10. The method of claim 9 wherein the optical signals conform to the Synchronous Optical Network (SONET) standards.

11. The method of claim 9 wherein the optical signals conform to the Synchronous Digital Hierarchy (SDH) standards.

12. The method of claim 1 wherein the first signal protocol comprises a plesiochronous signal.

13. The method of claim 12 wherein the plesiochronous signal comprises a STS-1 data stream.

14. The method of claim 12 wherein the plesiochronous signal comprises a DS1 data stream.

15. The method of claim 1 wherein the predetermined format comprises a data cell having a predetermined data payload and a header.

16. The method of claim 1 wherein the second signal protocol comprises a synchronous signal.

17. The method of claim 16 wherein the synchronous signal comprises a Virtual Tributary (VT) data stream.

18. The method of claim 17 wherein the VT data stream comprises one of a VT1.5, a VT2, a VT3 or a VT6 data stream.

19. A method comprising:
   receiving a first group of data blocks carrying data according to a first signal protocol and having a predetermined format from a switching fabric;
   converting the first group of data blocks to a first set of two or more groups of data blocks carrying data according to a second signal protocol and having the predetermined format;
   transmitting the first set of two or more groups of data blocks over the switching fabric, wherein converting the first group of data blocks to two or more groups of data blocks having the predetermined format comprises:
   converting the first group of data blocks to a data stream according to the first signal protocol on a destination processing device;

mapping multiple channels from the data stream according to the first signal protocol to individual data streams according to the second signal protocol; and converting the individual data streams according to the second signal protocol to the two or more groups of data blocks having the predetermined format, wherein each of the two or more groups of data blocks correspond to one of the multiple channels.

20. The method of claim 19 wherein converting the individual data streams according to the second signal protocol to the two or more groups of data blocks having the predetermined format comprises:

segmenting payload data from the individual data streams into blocks of data having a predetermined size; and appending a header and/or tail indicating a destination for the two or more groups of data blocks.

21. A method comprising:

receiving a first group of data blocks carrying data according to a first signal protocol and having a predetermined format from a switching fabric;

converting the first group of data blocks to a first set of two or more groups of data blocks carrying data according to a second signal protocol and having the predetermined format;

transmitting the first set of two or more groups of data blocks over the switching fabric as multiple streams;

converting a second set of two or more groups of data blocks to the second signal protocol, wherein converting the second set of two or more groups of data blocks to multiple data streams according to the second signal protocol comprises:

receiving the second set of two or more groups of data blocks from the switching fabric, wherein the second set of two or more groups of data blocks comprise data from multiple data streams to be transmitted to a common egress line card; and converting each of the two or more groups of data blocks to respective data streams according to the second signal protocol.

22. An apparatus comprising:

an ingress interface to receive an ingress group of data blocks having a predetermined format to provide a data stream according to a first protocol;

demapping circuitry coupled with the ingress interface to convert the data stream according to the first protocol to one or more data streams according to a second protocol;

a segmenter coupled with the demapping circuitry to convert the one or more data streams according to the second protocol to one or more corresponding egress groups of data blocks having the predetermined format;

an egress interface coupled with the segmenter to transmit the one or more egress groups of data blocks;

a second ingress interface to receive one or more ingress groups of data blocks having the predetermined format to provide one or more corresponding data streams according to the second protocol;

mapping circuitry coupled with the second ingress interface to convert the one or more data streams according to the second protocol to a single data stream according to the first protocol;

a second segmenter coupled with the mapping circuitry to convert the single data stream according to the first protocol to a group of data blocks having the predetermined format; and a second egress interface coupled with the second segmenter to transmit the group of data blocks.

23. The apparatus of claim 22 wherein the first protocol comprises a plesiochronous signal.

24. The apparatus of claim 23 wherein the plesiochronous signal comprises a STS-1 data stream.

25. The apparatus of claim 23 wherein the plesiochronous signal comprises a DS1 data stream.

26. The apparatus of claim 22 wherein the predetermined format comprises a data cell having a predetermined data payload and a header.

27. The apparatus of claim 22 wherein the second protocol comprises a synchronous signal protocol.

28. The apparatus of claim 27 wherein the synchronous signal protocol conforms to the Synchronous Optical Network (SONET) standards.

29. The apparatus of claim 27 wherein the synchronous signal protocol conforms to the Synchronous Digital Hierarchy (SDH) standards.

30. The apparatus of claim 27 wherein the synchronous signal comprises a Virtual Tributary (VT) data stream.

31. The apparatus of claim 30 wherein the VT data stream comprises one of a VT1.5, a VT2, a VT3 or a VT6 data stream.

32. An apparatus comprising:

an ingress interface to receive an ingress group of data blocks having a predetermined format to provide a data stream according to a first protocol;

demapping circuitry coupled with the ingress interface to convert the data stream according to the first protocol to one or more data streams according to a second protocol;

a segmenter coupled with the demapping circuitry to convert the one or more data streams according to the second protocol to one or more corresponding egress groups of data blocks having the predetermined format, wherein the segmenter partitions payload data from the one or more data streams according to the second protocol into corresponding blocks of data having a predetermined size and appends header and/or tail data indicating a destination for the respective groups of data blocks; and an egress interface coupled with the segmenter to transmit the one or more egress groups of data blocks.

33. The apparatus of claim 22 wherein the second segmenter partitions payload data from the data stream according to the first protocol into blocks of data having a predetermined size and appends header and/or tail data indicating a destination for the data blocks.

34. An apparatus comprising:

an ingress interface to receive an ingress group of data blocks having a predetermined format to provide a data stream according to a first protocol;

demapping circuitry coupled with the ingress interface to convert the data stream according to the first protocol to one or more data streams according to a second protocol;

a segmenter coupled with the demapping circuitry to convert the one or more data streams according to the second protocol to one or more corresponding egress groups of data blocks having the predetermined format;

an egress interface coupled with the segmenter to transmit the one or more egress groups of data blocks;

a switch fabric coupled with the ingress interface, the egress interface, a second ingress interface and a second egress interface, the switch fabric to route the data blocks having the predetermined format to selected destination devices; and a plurality of line cards coupled with the switch fabric to transmit and receive signals to and from external sources, wherein the plurality of line cards convert received signals to groups of data blocks having the predetermined format to transmit over the switch fabric, and further wherein the plurality of line cards receive groups of data blocks from the switch fabric and convert the received groups of data blocks to another format for transmission.

35. The apparatus of claim 34 wherein one or more of the plurality of line cards transmit and receive signals using the first protocol.

36. The apparatus of claim 34 wherein one or more of the plurality of line cards convert data streams according to the first protocol to optical signals and transmit the optical signals, and further wherein one or more of the plurality of line cards receive optical signals and convert the received optical signals to the first protocol.

37. An apparatus comprising:
means for receiving a first group of data blocks carrying data according to a first protocol and having a predetermined format from a switching fabric;
means for converting the first group of data blocks to a first set of two or more groups of data blocks carrying data according to a second protocol and having the predetermined format;
means for transmitting the first set of two or more groups of data blocks over the switching fabric;
means for receiving a second set of two or more groups of data blocks from the switching fabric;
means for converting the second set of two or more groups of data blocks to multiple data streams according to the second protocol; and
means for converting the multiple data streams according to the second protocol to a single output data stream according to the first signal protocol.

38. The apparatus of claim 37 further comprising means for converting the output data stream according to the first protocol to a third group of data blocks having the predetermined format.

39. The apparatus of claim 38 further comprising means for transmitting the third group of data blocks to an egress line card.

40. The apparatus of claim 39 further comprising means for converting the third group of data blocks to a data stream according to the first protocol on the egress line card.

41. The apparatus of claim 40 further comprising:
means for converting the data stream according to the first protocol on the egress line card to an optical signal; and
means for transmitting the optical signal to a remote device.

42. A system comprising:
an ingress interface to receive an ingress group of data blocks having a predetermined format to provide a data stream according to a first protocol;
demapping circuitry coupled with the ingress interface to convert the data stream according to the first protocol to one or more data streams according to a second protocol;
a segmenter coupled with the demapping circuitry to convert the one or more data streams according to the second protocol to one or more corresponding egress groups of data blocks having the predetermined format;
an egress interface coupled with the segmenter to transmit the one or more egress groups of data blocks;
a second ingress interface to receive one or more ingress groups of data blocks having the predetermine format to provide one or more corresponding data streams according to the second protocol;
mapping circuitry coupled with the second ingress interface to convert the one or more data streams according to the second protocol to a single data stream according to the first protocol;
a second segmenter coupled with the mapping circuitry to convert the single data stream according to the first protocol to a group of data blocks having the predetermined format;
a second egress interface coupled with the second segmenter to transmit the group of data blocks;
a switch fabric coupled with the ingress interface, the egress interface, the second ingress interface and the second egress interface, the switch fabric to route the data blocks having the predetermined format to selected destination devices;
a plurality of line cards coupled with the switch fabric to transmit and receive signals to and from external sources, wherein the plurality of line cards convert received signals to groups of data blocks having the predetermined format to transmit over the switch fabric, and further wherein the plurality of line cards receive groups of data blocks from the switch fabric and convert the received groups of data blocks to another format for transmission.

43. The system of claim 42 further comprising an optical fiber coupled with one of the plurality of line cards.

44. The system of claim 42 wherein the first protocol comprises a plesiochronous signal.

45. The system of claim 44 wherein the plesiochronous signal comprises a STS-1 data stream.

46. The system of claim 44 wherein the plesiochronous signal comprises a DS1 data stream.

47. The apparatus of claim 42 wherein the second protocol comprises a synchronous signal protocol.

48. The apparatus of claim 47 wherein the synchronous signal protocol conforms to the Synchronous Optical Network (SONET) standards.

49. The apparatus of claim 47 wherein the synchronous signal protocol conforms to the Synchronous Digital Hierarchy (SDH) standards.

50. The apparatus of claim 47 wherein the synchronous signal comprises a Virtual Tributary (VT) data stream.

51. The apparatus of claim 50 wherein the VT data stream comprises one of a VT1.5, a VT2, a VT3 or a VT6 data stream.

* * * * *